Aug. 9, 1966  W. J. FOXWELL  3,265,148
TRACTOR BATTERY SUPPORT
Filed Dec. 31, 1963  2 Sheets-Sheet 2
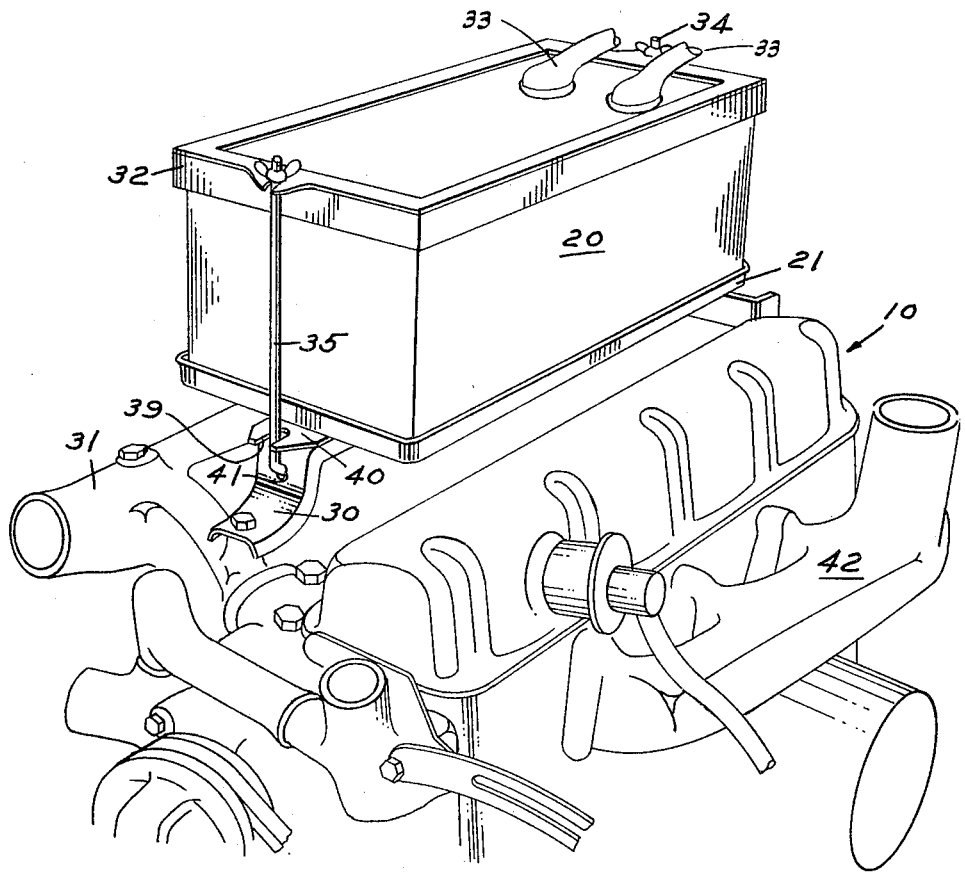
FIG. 2
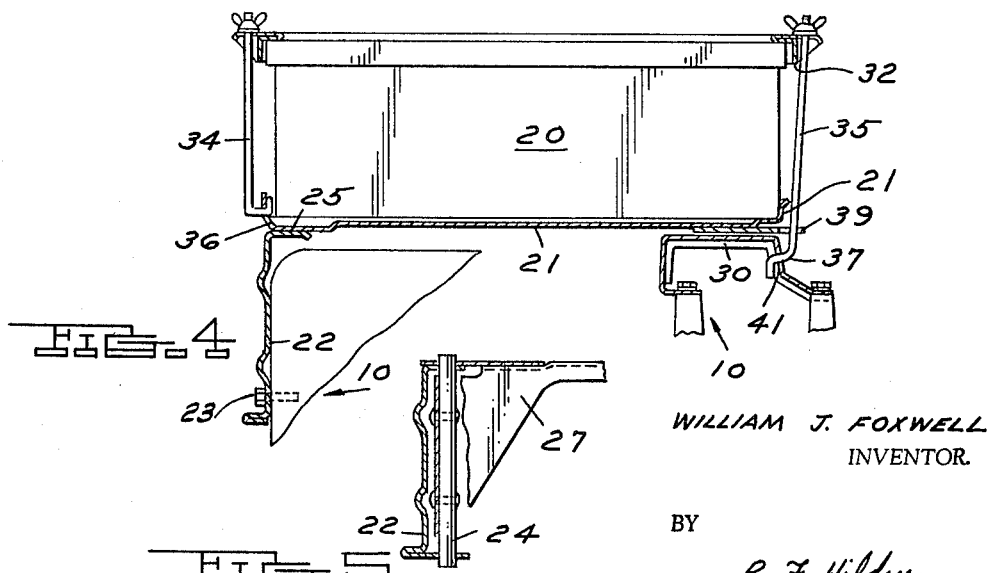
FIG. 4
FIG. 5
WILLIAM J. FOXWELL
INVENTOR.
BY
P. F. Hilden
ATTORNEY

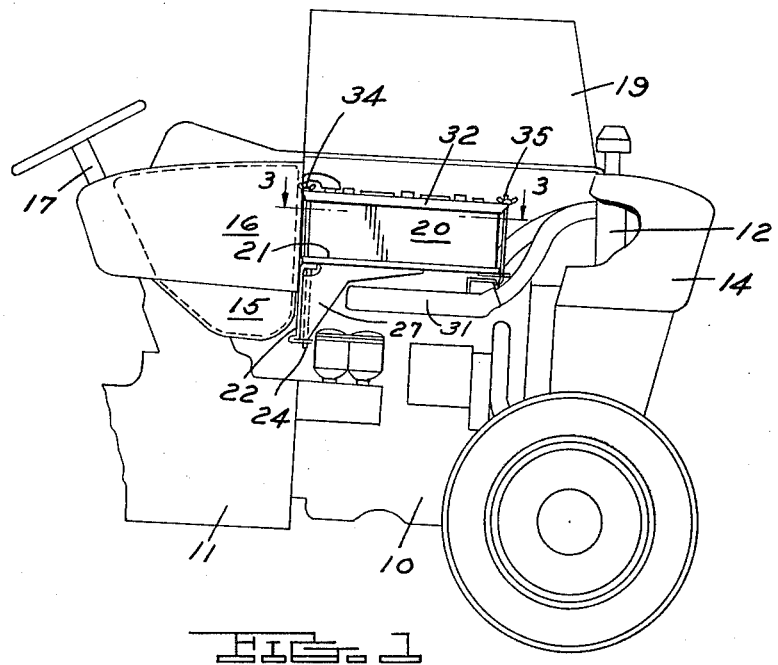
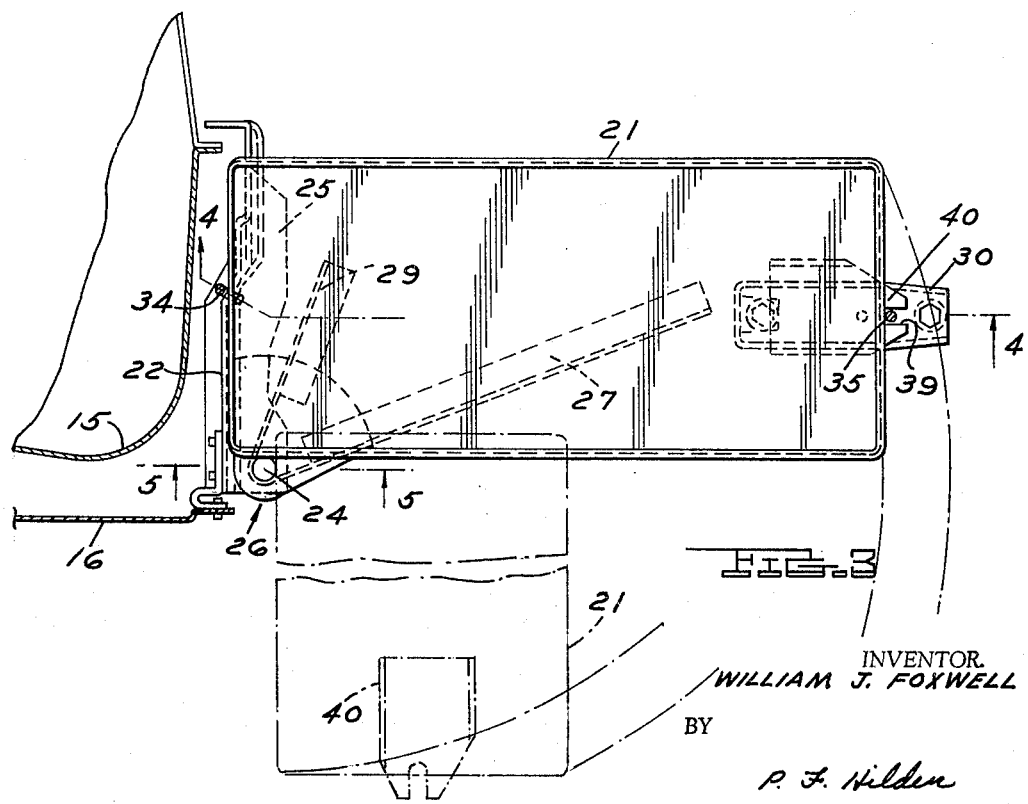
INVENTOR.
WILLIAM J. FOXWELL
BY
P. F. Hilden
ATTORNEY

United States Patent Office 3,265,148
Patented August 9, 1966

3,265,148
TRACTOR BATTERY SUPPORT
William J. Foxwell, Birmingham, Mich., assignor to Ford Motor Company, Dearborn, Mich., a corporation of Delaware
Filed Dec. 31, 1963, Ser. No. 334,830
6 Claims. (Cl. 180—68.5)

This invention relates to tractors of the off-highway type.

Off-highway tractors; e.g., agricultural and general purpose tractors, usually have the gas tank and battery mounted adjacent the engine for convenience and to avoid, insofar as possible, interference with visibility of the driver and with mounting implements on the tractor. The battery frequently has been placed above the clutch housing immediately behind the engine.

According to the present invention the battery is located immediately above the engine, thus leaving additional space above the clutch housing for the gas tank. To facilitate servicing the engine as well as the battery, the battery is mounted on a novel type of swing-out carrier. Preferably, the battery is mounted in a location removed from the exhaust manifold to protect against heating of the battery by the manifold.

Among the objects of the present invention are to provide a tractor having an improved arrangement of battery, engine and gas tank, having an improved battery location and battery carrier, and generally to improve tractors of the type described.

Other objects and objects relating to details of construction will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification in which:

FIGURE 1 is a somewhat diagrammatic side elevation of the front portion of a tractor having a battery mounted according to the present invention.

FIGURE 2 is a perspective view of the top portion of the engine, the battery being shown mounted in its holder above the engine.

FIGURE 3 is a somewhat diagrammatic top plan view of the battery holder, the battery holder being shown in full line in its normal position above the engine and being shown in broken line in swung-out position for servicing of the battery and engine. The battery is omitted and the tractor gas tank and shroud are shown in horizontal section.

FIGURE 4 is a vertical section of the battery holder taken on the line 4—4 of FIGURE 3, the battery and a portion of the engine being indicated.

FIGURE 5 is a vertical section of the pivot portion of the battery holder taken on the line 5—5 of FIGURE 3.

Referring now to the drawings, FIGURE 1 shows a tractor having a battery mounted in accordance with the present invention. The tractor shown is of the type in which the engine 10 and clutch and transmission housing 11 form a portion of the frame of the tractor. The engine is of the usual in-line type having vertically extending cylinders and may be either gasoline or diesel.

A radiator 12 is located immediately in front of the engine. The side edges of the radiator are covered by the usual radiator shell 14. A fuel tank 15 is located immediately behind the engine and above the clutch housing 11. The fuel tank preferably is at least partially covered by a shroud 16 which may also surround a steering shaft 17. A hood 19, extending between the radiator shell 14 and shroud 16, covers the engine.

According to the present invention, the storage battery 20 for supplying power for starting and operating the tractor engine is mounted on top of the engine 10 and beneath the hood 19. The battery 20 is supported on a tray or holder 21.

The battery holder 21 is a rectangular, shallow pan proportioned to receive the battery 20 and is pivotally supported for swinging movement about a vertical axis located adjacent a rear corner of the tray (see FIGURE 3) by a sheet metal bracket 22 mounted on the rear end of the engine 10 by bolts 23, one shown, and extending generally transversely of the tractor beneath the rear edge of the battery holder 21. The bracket 22 supports a short rod 24 located below the holder 21 and forming a vertical axis for swinging of the holder, as will be explained. The forward end of the shroud 16 may be secured to the end of the bracket 22.

The holder 21 has a flange portion 25 secured to the underside of the holder 21 and a brace portion 26 having its mid-portion bent about and secured to the rod 24 and its two outwardly diverging end portions 27 and 29 secured to the underside of the holder 21 to brace the holder. The construction is such that the battery 20 and holder 21 may be swung outwardly about the axis formed by the rod 24 from their normal positions extending longitudinally above the engine to a position in which they extend transversely from the rear corner of the engine.

A seat 30, which may be formed of sheet metal bolted to the intake manifold 31 of the engine, forms a forward support for the holder 21. The construction is such that as the battery and holder are swung into position over the engine 10 the underside of the holder will rest on the seat 30 so as to firmly support the weight of the battery.

The battery 20 is secured on the holder 21 by the customary rectangular frame 32 fitted over the top of the battery and held down by hold-down bolts 34 and 35. The hold-down bolt 34 is of the usual J shape, the lower end of the bolt being engaged about the rear edge portion 36 of the holder 21. The battery may be swung out without loosening the bolt 34. The cables 33, 33 for connecting the battery to the electrical system of the tractor, are led from the rear of the battery and sufficient slack is provided to swing the battery and carrier out without disconnecting the cables.

The bolt 35 likewise extends downwardly from the frame 32 and may be provided with a "Z" shaped lower end 37 which is received within an outwardly-opening slot 39 formed within a plate 40 secured to the underside of the holder 21. The end 37 of bolt 35 is received within a hole 41 formed within the seat 30 so that the bolt 35 not only holds down the forward end of the battery 20 but also locks the battery and holder from swinging out into laterally extended position. In order to swing the battery out, the bolt 35 must be disengaged from the frame 32 and removed from engagement with the seat 30.

The battery and holder are so positioned that the battery is carried above the intake manifold of the engine and extends to about the center of the engine. It is located a substantial distance from the exhaust manifold 42 of the engine and therefore the battery is not subjected to any substantial amount of heat from the exhaust manifold.

The battery holder of the present invention provides a ready means for swinging the battery outwardly from its normal position in order to service parts of the engine including spark plugs or fuel injector nozzles which normally are located in this portion of the engine. Further, it facilitates servicing of the battery or removal from the tractor. At the same time, the battery is covered and protected by the hood of the tractor and virtually the entire space behind the engine and above the clutch housing 11 is provided for the fuel tank 15.

What is claimed is:

1. In a tractor having an in-line engine with vertically extending cylinders and an exhaust manifold projecting from one side of the engine, a clutch housing behind the engine, a radiator in front of the engine and a sheet metal hood extending rearwardly from the radiator; a fuel tank mounted above the clutch housing and immediately behind the engine and a storage battery mounted on top of the engine and beneath the hood, the battery being offset from the longitudinal center-line of the engine in a direction away from the exhaust manifold.

2. In a tractor having an in-line engine with vertically extending cylinders and an exhaust manifold projecting from one side of the engine, a clutch housing behind the engine, a radiator in front of the engine and a sheet metal hood extending rearwardly from the radiator; a fuel tank mounted above the clutch housing and immediately behind the engine and a storage battery mounted on top of the engine and beneath the hood, the battery being offset from the longitudinal center-line of the engine in a direction away from the exhaust manifold, the battery being mounted on a support swingable about a vertical axis located adjacent a rear corner of the engine for swinging the battery and support outwardly from above the engine.

3. A swing-out battery holder for supporting a storage battery on an internal combustion engine, said holder having a bracket portion fixed to the rear end of the engine, a tray portion mounted for rotation about a vertical axis formed by the bracket portion and located adjacent a rear corner of the engine and below the tray portion, and means to hold a storage battery on the tray portion, the tray portion being adapted to be swung from a fore-and-aft position extending above the engine to a transversely extending position extending laterally from the rear side portion of the engine.

4. A swing-out battery holder for supporting a storage battery on an internal combustion engine, said holder having a bracket portion secured adjacent an end of the engine, a tray portion mounted for rotation about a vertical axis formed by the bracket portion and located beside the engine and below the tray portion, and means to hold a storage battery on the tray portion, the tray portion being adapted to be swung from a fore-and-aft position extending above the engine to a transversely extending position extending laterally from one side of the engine.

5. In a tractor having an in-line engine with vertically extending cylinders, a clutch housing behind the engine, a radiator in front of the engine and a sheet metal hood extending rearwardly from the radiator; a fuel tank mounted above the clutch housing and immediately behind the engine and a storage battery mounted on top of the engine and beneath the hood, the battery being mounted on a support swingable about a vertical axis located adjacent a rear corner of the engine for swinging the battery and support outwardly from above the engine.

6. A swing-out battery holder for supporting a storage battery above an internal combustion engine, said holder having a bracket portion secured adjacent an end of the engine, a tray portion mounted for rotation about a vertical axis formed by the bracket portion and located beside the engine, and means to hold a storage battery on the tray portion, the tray portion being adapted to be swung from a fore-and-aft position extending above the engine to a transversely extending position extending laterally from one side of the engine.

References Cited by the Examiner

UNITED STATES PATENTS

| | | | |
|---|---|---|---|
| 1,368,432 | 2/1921 | Hahn | 180—1 |
| 2,009,199 | 7/1935 | Pehotsky | 180—68.5 |
| 2,360,056 | 10/1944 | Heitshu | 180—68.5 |
| 2,709,494 | 5/1955 | Luce | 180—68.5 |

FOREIGN PATENTS 1,149,254  5/1963  Germany.

BENJAMIN HERSH, *Primary Examiner.*

MILTON L. SMITH, *Examiner.*